United States Patent Office 3,423,448
Patented Jan. 21, 1969

3,423,448
PROCESS FOR PREPARING ALIPHATIC
MONOISOCYANATES
Emmett H. Burk, Jr., Glenwood, Ill., and Donald D. Carlos, Crown Point, Ind., assignors to Sinclair Research, Inc., New York, N.Y., a corporation of Delaware
No Drawing. Filed Oct. 22, 1965, Ser. No. 502,381
U.S. Cl. 260—453                     7 Claims
Int. Cl. C07c *119/04;* C07d *95/00*

ABSTRACT OF THE DISCLOSURE

Aliphatic monoisocyanates are prepared by subjecting to thermal decomposition a cyclic nitrile sulfite which is free of chlorine-containing impurities and which has the structure:

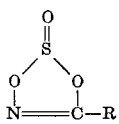

wherein R is an aliphatic (including cycloaliphatic) hydrocarbon of 1 to about 50, preferably 1 to about 30, carbon atoms.

---

The present invention is directed to a process for the production of aliphatic monoisocyanates. More specificially, the invention is directed to the production of aliphatic monoisocyanates by the thermal decomposition of aliphatic mono(nitrile sulfites).

The aliphatic mono(nitrile sulfites) which decompose to the corresponding aliphatic monoisocyanates in accordance with the process of the present invention, can be represented by the following structure:

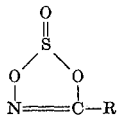

wherein R is an aliphatic (including cycloaliphatic) hydrocarbon of 1 to about 50 carbon atoms, preferably about 1 to 30 carbon atoms. The aliphatic hydrocarbon R can be saturated or unsaturated, straight or branched chain and is preferably alkyl, including cycloalkyl. R can also be further substituted with non-interfering groups as, for instance, with aromatic substitutents.

Aliphatic mono(nitrile sulfites) that can be used as the feed in the method of the present invention can be prepared for instance by the method described in copending application Ser. No. 502,604 to Emmett H. Burk and Donald D. Carlos filed concurrently herewith and now abondoned. Illustrative of suitable feeds are methyl mono(nitrile sulfite), ethyl mono(nitrile sulfite), isopropyl mono(nitrile sulfite), butyl mono(nitrile sulfite), isobutyl mono(nitrile sulfite), pentyl mono-nitrile sulfite), cyclohexyl mono(nitrile sulfite); 3,5-dimethylhexyl mono(nitrile sulfite); 2-ethylbutyl mono(nitrile sulfite); decalin mono(nitrile sulfite), n-nonyl mono(nitrile sulfite), n-dodecyl mono(nitrile sulfite), 2-pyropyldodecyl mono(nitrile sulfite), n-heptadecyl mono(nitrile sulfite), stearyl mono(nitrile sulfite), tricosyl mono(nitrile sulfite), butenyl mono(nitrile sulfite), octenyl mono(nitrile sulfite), 2-ethyloctenyl mono(nitrile sulfite), 3,5-dimethyldecenyl mono(nitrile sulfite), dodencyl mono(nitrile sulfite), oleyl mono(nitrile sulfite), cetene mono(nitrile sulfite), eicosene mono(nitrile sulfite), melene mono(nitrile sulfite), 4-chlorobutyl mono(nitrile sulfite, 8-nitrooctyl mono(nitrile sulfite), 1,3-butadiene mono(nitrile sulfite) and isoprene mono(nitrile sulfite).

Decomposition of the aliphatic mono(nitrile sulfite) to the corresponding aliphatic isocyanates can be effected by heating the aliphatic nitrile sufites to a temperature below the degradation point of the desired aliphatic isocyanate product. Since the decomposition reaction is exothermic there may be a tendency for the reaction temperature to run away. Means for carrying away or absorbing heat may be used, therefore, to control the temperature below the degradation point of the desired aliphatic isocyanate product.. The temperature employed will vary, of course, depending upon the decomposition temperature of the feed and degradation temperature of the particular aliphatic isocyanates being prepared. In most cases, however, temperature will usually fall in the range of about 50 to 200° C., preferably about 75 to 150° C. Advantageously, the decomposition is conducted in the presence of an inert solvent such as benzene, xylenes, toluene, chlorobenzene and the like or in excess thionyl chloride.

The ability of the aliphatic nitrile sulfites to generate isocyanates upon heating provides an additional advantage to the consumer in that the aliphatic nitrile sulfites, in contrast to isocyanates, are stable in the absence of water and therefore can be easily handled and stored. Also, since there is no active hydrogen, (e.g., in the form of HCl) present in the aliphatic mono(nitrile sulfites) or in the decomposition products formed, to react with the isocyanate when the latter is made, use of the aliphatic nitrile sulfites for the production of isocyanates provides a method that does not suffer from the reduced yields and separation and purification problems presented by the by-products obtained from starting materials of commercial methods wherein active hydrogen is present. Use of the aliphatic nitrile sulfites in the preparation of isocyanates, furthermore, provides a process having advantages over commercial methods employing azides in that the former do not have the explosion tendencies of the latter and are more economical.

The aliphatic mono(nitrile sulfites) can be prepared by reacting an aliphatic monohydroxamic acid and thionyl chloride. Aliphatic hydroxamic acids which react with thionyl chloride to produce aliphatic mono(nitrile sulfites) can be represented by the structure:

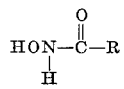

wherein R is as defined above in the structure of the aliphatic mono(nitrile sulfites).

Ilustrative of aliphatic monohydroxamic acids suitable for use as the reactant in the preparation of the aliphatic mono(nitrile sulfites) of the invention are the following: methylhydroxamic acid, ethylhydroxamic acid, propylhydroxamic acid, isopropylhydroxamic acid, butylhydroxamic acid, isobutylhydroxamic acid, pentylhydroxamic acid, 1-methyl-2-propylhexylhydroxamic acid, cyclohexylhydroxamic acid, 3,5-dimethylhexylhydroxamic acid, 2-ethylbutylhydroxamic acid, n-nonylhydroxamic acid, decalinhydroxamic acid, n-dodecylhydroxamic acid, 2-propyldodecylhydroxamic acid, n-heptadecylhydroxamic acid, stearylhydroxamic acid, tricosylhydroxamic acid, pentenyl-3-hydroxamic acid, pentenyl-2-hydroxamic acid, octenyl-7-hydroxamic acid, 2-ethyloctenyl7-hydroxamic acid, 3,5-dimethyldecenyl-9-hydroxamic acid, n-dodecenyl-11-hydroxamic acid, oleylhydroxamic acid, cetenehydroxamic acid, eicosenehydroxamic acid, cerotenehydroxamic acid, melenehydroxamic acid, 4-chlorobutylhydroxamic acid, 3,5-dibromohexylhydroxamic acid, 8-nitrooctylhydroxamic acid, 1,3-butadienehydroxamic acid and isoprenehydroxamic acid.

The temperature for effecting the reaction of the aliphatic monohydroxamic acid and thionyl chloride may vary depending upon the particular aliphatic hydroxamic acid selected but in all cases should be conducted below the decomposition temperature of the desired aliphatic mono(nitrile sulfite). Reflux temperatures can also be used as long as the reflux temperature of the particular mixture is below the decomposition temperature of the corresponding aliphatic mono(nitrile sulfite) produced. The reaction temperature will usually fall in the range of up to about 90° C., often up to about 40° to 70° C., preferably up to about 30° C. The reaction can be run at temperatures as low as about minus 30° C. Ordinarily the reaction will proceed readily at atmospheric pressure but sub- and superatmospheric pressure can be employed if desired.

Either the aliphatic hydroxamic acid reactant or the thionyl chloride reactant can be in excess but it is preferred that at least a stoichiometric amount of thionyl chloride be used, that is, a ratio of at least one mole of thionyl chloride per hydroxamic acid substituent. A large excess of thionyl chloride is particularly preferred. The reaction can be conducted in the liquid phase and in many cases the aliphatic hydroxamic acid will react from the solid state. Advantageously the aliphatic monohydroxamic acid is first dissolved or slurried in an oxygen-containing organic solvent. Illustrative of suitable oxygen-containing solvents are the thionyl chloride reactant itself and normally liquid organic ethers, esters, furans, dioxanes and the like. The preferred solvent is the thionyl chloride reactant, an excess of which will partially dissolve the aliphatic monohydroxamic acid.

The reaction is often over in less than about 0.5 hour, for example, 15 minutes or in about 5 to 20 hours, depending upon the reaction temperature employed and is marked by a cessation in hydrogen chloride gas evolution. Normally at least about 0.5 hour is required for the reaction to go to completion at temperatures which minimize side reactions. The reaction is usually quite rapid as the aliphatic monohydroxamic acid is dissolved. At the lower reaction temperatures the aliphatic hydroxamic acid is generally slow to dissolve and may even come out of solution, go back into solution, etc., during the reaction.

The aliphatic mono(nitrile sulfite) can be recovered from the resulting solution by any desirable means, for instance, by first filtering the resulting solution to remove any unreacted starting materials and subjecting the filtrate to reduced pressure to remove unreacted thionyl chloride and inert solvent, if employed, and provide the aliphatic mono(nitrile sulfite) as a crude product. Alternatively, prior to the filtering step, the solution can be cooled to crystallize out the product which is then recovered as described. The crude product, which can be either crystalline or liquid depending on the particular aliphatic mono(nitrile sulfite) prepared, contains small amounts of impurities high in chlorine content. A purer product essentially chlorine-free can be obtained by recrystallization techniques as, for instance, from a suitable solvent such as dichloromethane, carbon disulfide, ethyl acetate, thionyl chloride and the like or mixtures thereof.

A convenient alternative method for obtaining an essentially chlorine-free aliphatic mono(nitrile sulfite) is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular aliphatic mono(nitrile sulfite) feed selected. If desired, a combination of both the recrystallization and extraction methods can be used to obtain essentially chlorine-free aliphatic mono(nitrile sulfite). Thermal decomposition of the essentially chlorine-free feed in accordance with the method of the present invention results in improved yields of a purer isocyanate product, which is also essentially chlorine-free.

The following examples will serve to further allustrate the present invention.

Example I

To a 300 cc. fluted, round bottom flask equipped with a reflux condenser attached to a CaCl₂ drying tube, are added 9.8 g. (0.050 mole) of butylhydroxamic acid and 165 g. (1.35 moles) of thionyl chloride. The reaction mixture is stirred mechanically; and heated to reflux for half an hour. The resulting solution is filtered and the thionyl chloride removed under reduced pressure to obtain a propyl mono(nitrile sulfite) product containing small amounts of impurities. Recrystallization from carbon disulfide gives propyl mono(nitrile sulfite).

To a 500 cc. round bottom flask equipped with a reflux condenser attached to a CaCl₂ drying tube is added 12 g. (0.050 mole) of the thus prepared propyl mono(nitrile sulfite) and 200 cc. of o-dichlorobenzene. The reaction mixture is stirred mechanically and heated to reflux for two hours. The resulting solution is fractionally distilled to give chlorine-free propylisocyanate.

Example II

To a 300 cc. fluted, round bottom flask equipped with a reflux condenser attached to a CaCl₂ drying tube, is added 9.8 g. (0.050 mole) of decalinhydroxamic acid and 121 g. (1.01 moles) of thionyl chloride. The reaction mixture is stirred mechanically and heated to reflux for two hours. The resulting solution is filtered and the thionyl chloride removed under reduced pressure to obtain a decalin mono(nitrile sulfite) product containing small amounts of impurities. Recrystallization from dichloromethane gives chlorine-free decalin mono(nitrile sulfite) which on decomposition in chlorobenzene as in Example I, provides a chlorine-free decalin isocyanate.

It is claimed:
1. A process for the production of aliphatic mono-isocyanates which consists essentially of subjecting to thermal decomposition, at a temperature below the degradation point of the desired isocyanate, an aliphatic mono (nitrile sulfite) compound which is essentially free of chlorine-containing impurities and which has the structure:

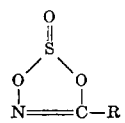

wherein R is aliphatic hydrocarbon of 1 to about 50 carbon atoms.

2. The process of claim 1 wherein R contains 1 to about 30 carbon atoms.

3. The process of claim 2 wherein R is alkyl.

4. The process of claim 2 wherein the mono(nitrile sulfite) compound subjected to the decomposition is decalin mono(nitrile sulfite) and the aliphatic monoisocyanate produced thereby is decalin isocyanate.

5. A process for the preparation of aliphatic mono-isocyanates which consists essentially of reacting thionyl chloride and an aliphatic monohydroxamic acid having the structure:

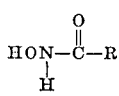

wherein R is aliphatic hydrocarbon of 1 to about 50 carbon atoms, separating from the resulting reaction product mixture an aliphatic mono(nitrile sulfite)which is essentially free of chlorine-containing impurities and which has the structure:

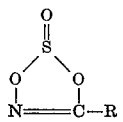

wherein R corresponds to that of said aliphatic monohydroxamic acid, and subjecting said aliphatic mono(nitrile sulfite) to thermal decomposition, at a temperature below the degradation point of the desired isocyanate, to provide the corresponding aliphatic monoisocyanate.

6. The process of claim 5 wherein R contains 1 to about 30 carbon atoms.

7. The process of claim 6 wherein R is alkyl.

References Cited

UNITED STATES PATENTS

| | | | |
|---|---|---|---|
| 2,394,597 | 2/1946 | Dickey et al. | 260—453 |
| 3,238,220 | 3/1966 | Boshagen | 260—301 XR |
| 3,268,542 | 8/1966 | Burk, et al. | 260—453 XR |

OTHER REFERENCES

Marquis: Compt. Rend. 143, pp. 1163–5 (1906).

CHARLES B. PARKER, *Primary Examiner.*

DOLPH H. TORRENCE, *Assistant Examiner.*

U.S. Cl. X.R.

260—301